United States Patent
Merzenich et al.

(10) Patent No.: US 8,206,156 B2
(45) Date of Patent: Jun. 26, 2012

(54) JOYSTICK FOR TRAINING TO IMPROVE SENSORY-GUIDED FINE MOTOR CONTROL OF THE HAND

(75) Inventors: Michael M. Merzenich, San Francisco, CA (US); Peter B. Delahunt, San Mateo, CA (US); Henry W. Mahncke, San Francisco, CA (US); Michael Scott Trujillo, Riverside, CA (US); Joseph L. Hardy, Richmond, CA (US)

(73) Assignee: Posit Science Corporation, San Francisco, CA (US)

( * ) Notice: Subject to any disclaimer, the term of this patent is extended or adjusted under 35 U.S.C. 154(b) by 1092 days.

(21) Appl. No.: 12/112,756

(22) Filed: Apr. 30, 2008

(65) Prior Publication Data

US 2009/0233768 A1 Sep. 17, 2009

Related U.S. Application Data

(60) Provisional application No. 61/035,902, filed on Mar. 12, 2008.

(51) Int. Cl.
*G09B 19/00* (2006.01)

(52) U.S. Cl. ........................................ 434/258; 434/236

(58) Field of Classification Search .................. 434/236, 434/322, 350, 258; 74/473.12; 463/7, 23, 463/37–38; 345/161–163
See application file for complete search history.

(56) References Cited

U.S. PATENT DOCUMENTS

| | | | |
|---|---|---|---|
| 6,948,398 B2 * | 9/2005 | Dybro | 74/471 XY |
| 2006/0154221 A1 * | 7/2006 | Jones et al. | 434/258 |
| 2007/0218439 A1 * | 9/2007 | Delahunt et al. | 434/236 |
| 2007/0298877 A1 * | 12/2007 | Rosenberg | 463/30 |

* cited by examiner

*Primary Examiner* — Timothy A Musselman
(74) *Attorney, Agent, or Firm* — James W. Huffman

(57) ABSTRACT

System and method for improving tactile sensitivity and precision/accuracy of motor control of the hand of a subject. A joystick is configured to provide commands to a computing device. The joystick includes a base, shaft, and a textured surface with a specified level of bumpiness. A computer-implemented exercise is executed, including presenting stimuli, including at least one target, to the subject via a computer display. The subject is required to respond to the stimuli via the joystick within a specified duration, including using the joystick to move a cursor to the target, and, upon reaching the target, disengage from the joystick. The subject's response to the stimuli is recorded, and a determination made regarding whether the subject responded correctly. The duration is modified based on whether the subject responded correctly to the stimuli. The presenting, requiring, recording, determining, and modifying are repeated a plurality of times in an iterative manner.

20 Claims, 9 Drawing Sheets coarse     medium     fine

JOYSTICK FOR TRAINING TO IMPROVE SENSORY-GUIDED FINE MOTOR CONTROL OF THE HAND

CROSS REFERENCE TO RELATED APPLICATION(S)

This application claims the benefit of the following U.S. Provisional Patent Application, which is incorporated herein in its entirety for all purposes:

| PS.0152 | 61/035902 | Mar. 12, 2008 | Joystick for Training to Improve Focal Hand Dystonia |

The following references are hereby incorporated by reference in their entirety as though fully and completely set forth herein:

U.S. patent application Ser. No. 11/032,894, titled "A METHOD FOR ENHANCING MEMORY AND COGNITION IN AGING ADULTS", filed Jan. 11, 2005, and whose inventors are Michael M. Merzenich, Daniel M. Goldman, Joseph L. Hardy, Henry W. Mahncke, and Jeffrey S. Zimman.

U.S. patent application Ser. No. 11/468,814, titled "COGNITIVE TRAINING USING A MAXIMUM LIKELIHOOD ASSESSMENT PROCEDURE", filed Aug. 31, 2006, and whose inventors are Samuel Chungchi Chan, Joseph L. Hardy, and Henry W. Mahncke.

FIELD OF THE INVENTION

This invention relates in general to the use of brain health devices and programs utilizing brain plasticity to enhance human performance and correct neurological disorders, and more specifically, to a joystick and software for improving tactile sensitivity and precision and accuracy of motor control of the hand of a subject.

BACKGROUND OF THE INVENTION

In healthy humans, sensory systems are intricately organized in the cortex where specific areas are dedicated to processing specific sensory input (known as the cortical sensory map). This phenomenon holds true in the sensory and motor domains (known as somatotopic cortical representation). For example, stimulation of the index finger excites a very distinct portion of the cortex while stimulation of the middle finger excites a different distinct part of the cortex. Many studies have shown that somatotopic cortical representation is plastic and can change in response to environmental exposure and learning (termed brain plasticity). For example, rats exposed to an impoverished environment showed a degradation of the somatosensory cortical map (Coq & Xerri, 1999) whereas rats exposed to an enriched tactile environment showed a refinement of sensory representation (Coq & Xerri, 1998). Thus, environmental factors can lead to positive or negative plastic changes in the fidelity of representations in cortical maps.

Similar to the effects seen in rats, monkeys who trained on a tactile discrimination task demonstrated refined cortical receptive fields for the portion of the finger that was trained (Recanzone, Merzenich, Jenkins, Grajski, & Dinse, 1992). Additionally, it has been shown that somatotopic changes likely contribute to improved performance in the task (Recanzone, Jenkins, Hradek, & Merzenich, 1992). These findings suggest that refined sensory representation of peripheral effectors (hands, fingers, etc.) may lead to improved motor performance. Conversely, some have hypothesized that certain motor impairments are a result of negative neural reorganization as a response to learned behaviors (Byl et al., 1997; Lenz & Byl, 1999; Lenz et al., 1999; Lim, Altenmuller, & Bradshaw, 2001). A profound example of impaired motor control is hand function (manual dexterity) of older adults. It is widely accepted that older adults demonstrate reduced manual dexterity. A reduction in manual dexterity cannot be entirely accounted for by cutaneous sensory impairment, mechanoreceptor impairments or peripheral effector ailments such as arthritis or diabetic neuropathy (Cole, Rotella, & Harper, 1999). Since impairments in hand function cannot be entirely explained by problems in the hand itself, changes in higher control centers within the nervous system must account for the remaining reduced dexterity seen with age.

Healthy adults are remarkably adept at using their hands to manipulate a diversity of objects, adjusting force output to various object properties with limited conscious awareness. The manner in which forces are adjusted is dependent on appropriate integration of the sensory and motor systems (Johansson, 1996; Johansson & Cole, 1992; Johansson & Westling, 1991). As an object is manipulated with the hand, force output is calibrated by information provided by mechanoreceptors in the joints, muscles and tendons as well tactile sensory feedback from the skin. The typical result of this feedback loop is skillful object manipulation. However, when sensory-motor integration goes awry, the result is impaired motor control. Various examples of this occur in normal aging. For example it has been shown that age related changes in subcortical (Emborg et al., 1998) and cortical (Ward & Frackowiak, 2003) areas correlate with age-related changes in motor function of the hand. Some of the changes in the nervous system that contributed to reduced manual dexterity are due to negative plasticity. With an appropriate sensory-motor training program, some or all of the manual dexterity that is lost to negative plasticity can be recovered.

A prerequisite of skillful object manipulation (manual dexterity) is adequate and economic modulation of prehensile force output. This is accomplished through an integration between somatosensory input and motor output where the forces applied to an object are calibrated based on information provided by mechanoreceptors of the hand and tactile sensors on the skin (R. S. Johansson, 1996; R. S. Johansson & Cole, 1992; R. S. Johansson, Riso, Hager, & Backstrom, 1992; R. S. Johansson & Westling, 1984, 1987, 1991; Sober & Sabes, 2003). Sensory-motor integration occurs at several levels in the nervous system. It has been demonstrated that the nervous system is plastic and can change in response to environmental exposure and learning (termed brain plasticity). When neural reorganization occurs in the sensory-motor pathways, the result is either improved motor control (Bourgeon, Xerri, & Coq, 2004; Tegenthoff et al., 2005) or aberrant motor control (Byl et al., 1997; Byl, Nagarajan, & McKenzie, 2003; Byl, Nagarajan, Merzenich, Roberts, & McKenzie, 2002). Brain plasticity resulting to improved performance can be referred to as positive plasticity, whereas brain plasticity resulting in impaired performance can be referred to as negative plasticity.

The hand is especially sensitive to changes in neural organization. For example, monkeys exposed to limited tactile stimulation resulted in cortical reorganization of both the stimulated and non-stimulated portions of the hand (Jenkins, Merzenich, Ochs, Allard, & Guic-Robles, 1990). There is evidence that a refined somatotopic map leads to improved performance in sensorimotor tasks (Recanzone, Jenkins, Hradek, & Merzenich, 1992) and that degraded somatotopic organization results in impaired performance (Cole, Rotella, & Harper, 1999; Lenz & Byl, 1999; Lenz et al., 1999).

Cortical organization is partially determined by a competition of stimuli, with the stimulus that contributes the most input winning cortical real estate. For example, if a person engages in a lifestyle where a majority of the neural input from his/her hand is a small focal area, then that small focal area will dominate the resources for neural representation and will received expanded representation. Some examples of this are found in Braille readers, string musicians, and pianists. These activities result in an expansion of the pad of the fingertip and a dedifferentiation of the digits.

Humans engage in a multitude of activities that may negatively effect cortical organization. People who receive limited tactile stimulation of their fingers, for example, the above mentioned string musicians or pianists, are often afflicted with an ailment known as Focal Hand Dystonia (FHD), which is a disorder of neuroplasticity that results in abnormal motor control, specifically involuntary spastic contractions of the hand and fingers. Said another way, negative plasticity is partially caused by stereotyped isolated stimulation of one portion of the hand (typically the pad of the finger tip). When this occurs, the representation of the portion of the hand that is highly stimulated dominates the representation of the entire hand. The result is heightened representation of the stimulated part and depressed representation of the remaining un-stimulated portions, which results in decreased sensory-guided fine motor control.

Such loss of sensory-guided fine motor control, due to degraded sensory maps, may substantially degrade the capabilities of people who might otherwise operate normally in their daily life, and thus may negatively affect their quality of life, e.g., professional functionality, recreation, etc.

Thus, improved systems and methods for improving sensory-guided fine motor control of the hand are desired.

SUMMARY

Various embodiments of a system and method for improving tactile sensitivity and precision and accuracy of motor control of the hand of a subject are presented.

Haptic Joystick

In preferred embodiments of the present invention, a specialized joystick may be provided that, in conjunction with a computer-based training program, may facilitate improvement of tactile sensitivity and precision and accuracy of motor control of the hand of a subject, e.g., sensory-guided fine motor control of the subject's hand. In one embodiment, a joystick may be provided that includes various features directed to tactile stimulation of the subject's hand, and is referred to herein as a "haptic" joystick, although other functionally similar terms may apply, as well.

The joystick may include a base and a shaft coupled to the base, and may be communicatively coupled to a computing device, e.g., a personal computer or workstation. In some embodiments, the joystick may include one or more sensors coupled to the shaft, each sensor configured to detect engagement (and disengagement) of the subject's hand with the joystick, e.g., one or more touch-sensitive sensors. For example, the joystick may be operable to send data to the computer indicating position, e.g., position with respect to X and Y axes (e.g., from −1 to +1 with −1, −1, being the bottom left corner), as well as contact status (detecting whether the subject's hand is in contact with the shaft), e.g., 1000= nothing is touching sensor, and 0= hand is touching sensor, although other mappings may be used as desired. Additionally, or alternatively, the joystick may include a key or button, e.g., on the base of joystick, that may be used to indicate disengagement from the joystick. For example, the subject may release the joystick shaft and press the button (with the same hand) to indicate disengagement. In other embodiments, the subject may press a key on a keyboard instead.

In preferred embodiments, a textured surface covers at least a portion of the joystick, where the textured surface includes a plurality of bumps at a specified density and range of bump sizes, together referred to as a specified "bumpiness". In some embodiments, the surface may also be rugose, e.g., may have a ridged or wrinkled texture, e.g., in addition to the bumps.

The rationale for using a haptic joystick is to stimulate competing inputs and awaken the degraded portions of the neural representations of the hand. In providing this enriched tactile environment, it is important to adapt the textured surface of the joystick so as to introduce additional enrichment. Thus, in some embodiments, the joystick may facilitate modification of the surface to change the specified bumpiness and/or rugosity of the joystick. For example, in some embodiments, modular surface patches or sleeves with different levels of bumpiness and/or rugosity may be provided, e.g., one modular patch/sleeve per level of bumpiness or rugosity.

Thus, in some embodiments, the joystick may be adapted during an exercise to include various (progressive) levels of bumpiness and/or rugosity.

Training Exercises Utilizing a Joystick

The following describes various embodiments of a method for improving tactile sensitivity and precision and accuracy of motor control of the hand of a subject, e.g., sensory-guided fine motor control of the hand of a subject, utilizing a computing device to present stimuli to the subject, and to record responses from the subject. Moreover, in some embodiments, the method includes determining a psychophysical threshold for the subject.

A joystick may be provided, such as an embodiment of the haptic joystick described above. The joystick may include a base, a shaft movably coupled to the base, and a textured surface covering at least a portion of the joystick, where the textured surface has a specified level of bumpiness. The joystick may be communicatively coupled to the computing device, and configured to provide commands to the computing device, e.g., cursor positioning commands, and in some embodiments, sensor data regarding engagement/ disengagement of the subject's hand with the joystick.

A computer-implemented exercise may be executed, i.e., performed. Executing the exercise may include presenting one or more stimuli to the subject via a computer display, including presenting at least one target. In other words, one or more targets may be displayed on the computer display, e.g., a graphical shape, symbol, or icon, among others. In preferred embodiments, a trial in the exercise may include a series of targets, although in other embodiments, a trial may only present a single target.

The subject may be required to respond to the stimuli via the joystick, including requiring the subject to use the joystick to move a cursor to the at least one target, and, upon reaching the at least one target, disengage the subject's hand from the joystick, including disengaging the hand from the textured surface of the joystick. In embodiments where multiple targets are presented in succession, to complete a trial, the subject may be required to move the cursor to each target, and, upon reaching each target, disengage the subject's hand from the joystick, before resuming the trial, i.e., before moving the cursor to the next target. In preferred embodiments, the subject may be required to perform the moving and reaching within a specified duration. In other words, the subject may be required or expected to complete the trial within a specified time period. As will also be described in more detail below, in some embodiments, e.g., depending on the particular exercise being performed, additional constraints may be imposed in a trial. For example, in some embodiments, the subject may be required to follow specified paths to reach the targets, where the subject is penalized if the cursor deviates from the path, e.g., by failing the trial if the subject leaves the path some specified number of times.

The subject's response to the stimuli may be recorded, and a determination may be made as to whether the subject responded correctly to the stimuli. For example, the method may determine whether the criteria for passing the trial were met, e.g., whether the subject correctly reached each target in the trial within the specified duration, and properly disengaged the joystick after reaching each target. As noted above, in some embodiments, additional constraints may be imposed, and so the determination may also be made with respect to performing the trial within the given constraints.

In some embodiments, an indication, e.g., a graphical and/or audible indication, may be provided to the participant indicating the correctness or incorrectness of the participant's response, e.g., a "ding" or a "thunk" may be played to indicate correctness or incorrectness, respectively, and/or points may be awarded (in the case of a correct response). Of course, any other type of indication may be used as desired, e.g., graphical images, animation, etc. Thus, the subject may be presented with a reward and/or punishment (or simply information) based on the subject's performance.

The specified duration may be modified based on whether the subject responded correctly to the stimuli. Said another way, the duration may be adaptively adjusted based on the subject's performance in a trial. For example, in one embodiment, modifying the duration based on the subject's response may include increasing the duration if the subject responds incorrectly, and decreasing the duration if the subject responds correctly. Thus, the task may be made easier or more difficult by changing the duration of the trial.

In one embodiment, the duration (of the trials) may be modified in accordance with a maximum likelihood procedure, such as a QUEST (quick estimation by sequential testing) threshold procedure, and/or a ZEST (zippy estimation by sequential testing) threshold procedure, described in more detail below, although other threshold procedures may be used as desired. Alternatively, or additionally, in some embodiments, other schemes may be employed to adjust the difficulty of the presented stimuli, e.g., to adjust the stimulus and/or its presentation, e.g., the duration. For example, in some embodiments, an N-up/M-down procedure may be used, where the duration may be increased if the subject incorrectly performs N trials consecutively, decreased if the subject correctly performs M trials consecutively. For example, in one embodiment, the N-up/M-down procedure may be a 1-up/3-down procedure, where if the subject incorrectly performs 1 trial, the duration is increased, and if the subject correctly performs 3 trials in succession, the duration is decreased, although it should be noted that any other values (for N and M) may be used as desired. As another example, the stimuli and/or their presentation may be modified by a clinician or attendant, e.g., the system may receive user input from the clinician modifying the duration, e.g., via a GUI. In this case, the clinician may monitor the subject's performance, and modify the duration as appropriate, e.g., according to a specified adaptive scheme or rules. Note that other attributes of the stimuli and/or presentation may be modified as desired.

Thus, for each trial, the duration for that trial may be determined by the performance of the previous trial, or of a plurality of previous trials, as will be discussed below. In other words, the subject's response to the stimulus, or to previous stimuli (e.g., correctly performing n trials consecutively), may determine the next duration, e.g., via a maximum likelihood method, or, as described above, the duration may be adaptively adjusted based on the subject's performance over a series of trials, e.g., based on the most recent n trials, where n is a specified integer value. Note that in various other embodiments, other duration modification schemes may be used as desired.

Finally, the presenting, requiring, recording, determining, (and in some embodiments, the indicating) and modifying may be repeated a plurality of times in an iterative manner to improve tactile sensitivity and precision and accuracy of motor control of the hand of a subject, e.g., sensory-guided fine motor control of the hand. In other words, the method may include performing a plurality of trials using a variety of durations determined based on the subject's response to enhance the subject's tactile sensitivity and precision and accuracy of motor control of the hand. For example, in preferred embodiments, the repeating may be preformed over a plurality of sessions, where the repeating occurs a specified number of times each day, for a number of days.

Thus, in some embodiments, the repeating may include performing trials under each of a plurality of conditions, where each condition specifies the stimuli and/or their presentation, possibly including attributes of the joystick, and where the conditions become more difficult as the subject progresses through the exercise. Each condition may thus specify some combination of attributes of the trials. Based on performance, the subject may progress through the exercise, performing trials under a series of conditions, where, over the course of the exercise, the conditions may make the trials more difficult. In some embodiments, the subject may progress through various levels or stages, e.g., where the lower levels or stages involve trials under easier conditions, and later levels or stages involve trials under more difficult conditions.

Other features and advantages of the present invention will become apparent upon study of the remaining portions of the specification and drawings.

DETAILED DESCRIPTION

Figure 1:
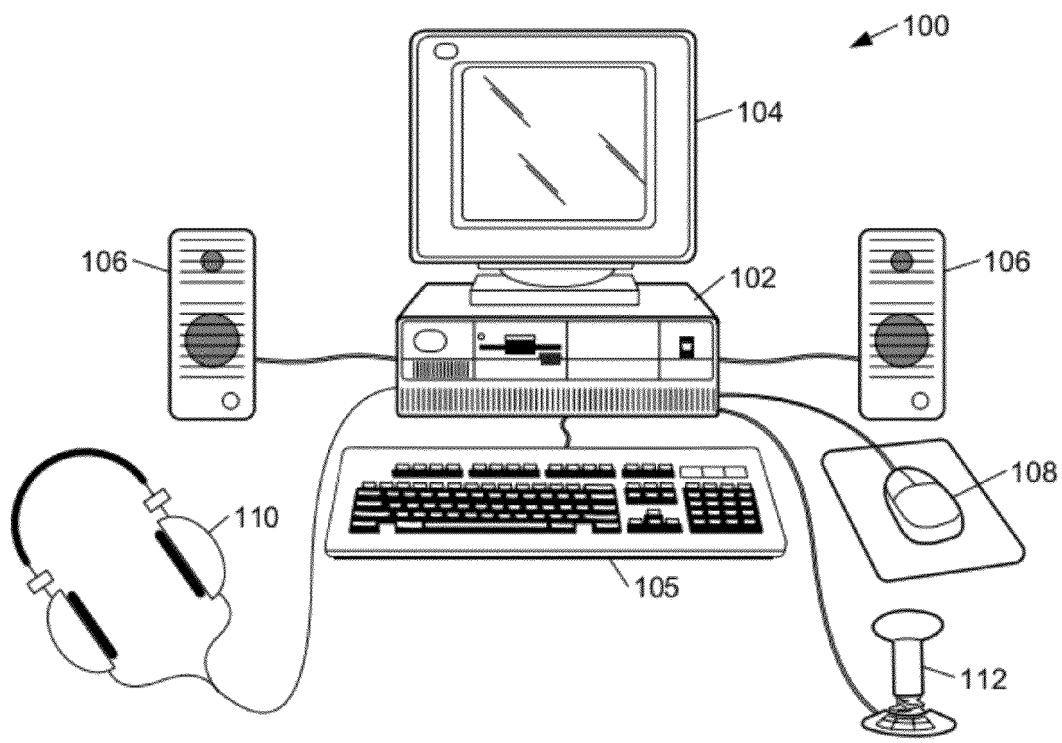
FIG. 1 is a block diagram of a computer system configured to implement embodiments of the present invention.

Referring to FIG. 1, a computer system 100 is shown for executing a computer program to train, or retrain an individual according to the present invention to improve the accuracy and precision of sensory representations of tactile information of the hand, thereby improving fine motor control of the hand. The computer system 100 contains a computer 102, having a CPU, memory, hard disk and CD ROM drive (not shown), attached to a monitor 104. The monitor 104 provides visual prompting and feedback to the subject during execution of the computer program. Attached to the computer 102 are a keyboard 105, speakers 106, a mouse 108, headphones 110, and a joystick 112, according to one embodiment. The speakers 106 and the headphones 110 provide auditory prompting and feedback to the subject during execution of the computer program. The mouse 108 may allow the subject to launch and navigate through the computer program. The keyboard 105 may allow an instructor to enter alpha numeric information about the subject into the computer 102. The joystick 112 provides means through which the subject may perform tasks in one or more exercises, and may include various novel features which, in combination with the exercises, may operate to improve sensory-guided fine motor control of the subject's hand(s), as will be described in detail below. Although a number of different computer platforms are applicable to the present invention, embodiments of the present invention execute on either IBM compatible computers or Macintosh computers, or similarly configured computing devices such as set top boxes, PDA's, gaming consoles, etc. The computer system 100 includes a memory medium that stores software, i.e., program instructions, implementing one or more exercises that may operate in conjunction with the joystick 112 to train a subject to improve sensory-guided fine motor control of the hand (or hands).

Figure 2:
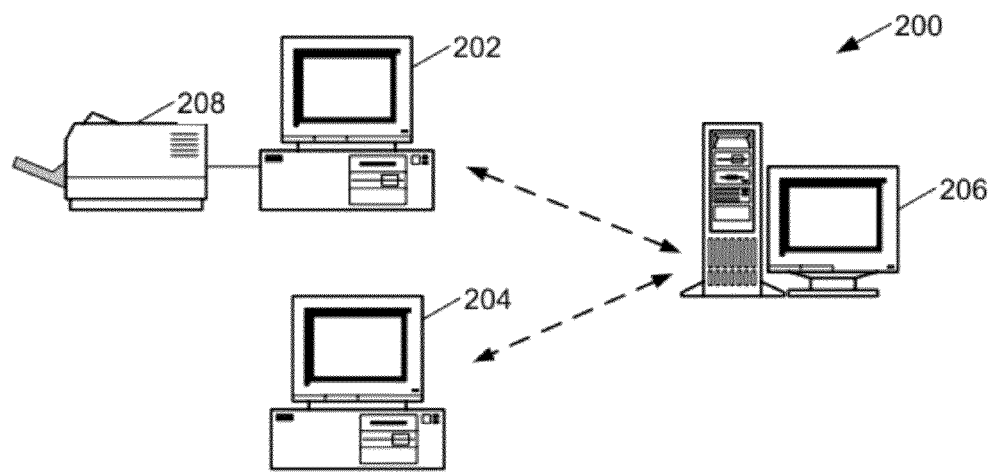
FIG. 2 is a block diagram of a computer network configured to implement embodiments of the present invention.

Now referring to FIG. 2, a computer network 200 is shown. The computer network 200 contains computers 202, 204, similar to that described above with reference to FIG. 1, connected to a server 206. The connection between the computers 202, 204 and the server 206 can be made via a local area network (LAN), a wide area network (WAN), or via modem connections, directly or through the Internet. A printer 208 is shown connected to the computer 202 to illustrate that a subject can print out reports associated with the computer program of the present invention. The computer network 200 allows information such as test scores, game statistics, and other subject information to flow from a subject's computer 202, 204 to a server 206. An administrator can then review the information and can then download configuration and control information pertaining to a particular subject, back to the subject's computer 202, 204. One or more of the computer systems of FIG. 2 may be configured with software, according to embodiments of the present invention.

Note that while FIG. 2 shows no peripherals, one should assume that computer 202 and/or 204 is coupled to a joystick, e.g., joystick 112, and one or more of the other peripherals shown in FIG. 1.

Haptic Joystick

In preferred embodiments of the present invention, a specialized joystick may be provided that, in conjunction with a computer-based training program, may facilitate improvement of tactile sensitivity and precision and accuracy of motor control of the hand of a subject, e.g., sensory-guided fine motor control of the subject's hand. In one embodiment, a joystick may be provided that includes various features directed to tactile stimulation of the subject's hand, and is referred to herein as a "haptic" joystick, although other functionally similar terms may apply, as well.

The joystick may include a base and a shaft coupled to the base, and may be communicatively coupled to a computing device, e.g., a personal computer or workstation. In some embodiments, the joystick may include one or more sensors coupled to the shaft, each sensor configured to detect engagement (and disengagement) of the subject's hand with the joystick, e.g., one or more touch-sensitive sensors. For example, the joystick may be operable to send data to the computer indicating position, e.g., position with respect to X and Y axes (e.g., from −1 to +1 with −1, −1, being the bottom left corner), as well as contact status (detecting whether the subject's hand is in contact with the shaft), e.g., 1000= nothing is touching sensor, and 0= hand is touching sensor, although other mappings may be used as desired. Additionally, or alternatively, the joystick may include a key or button, e.g., on the base of joystick, that may be used to indicate disengagement from the joystick. For example, the subject may release the joystick shaft and press the button (with the same hand) to indicate disengagement. In other embodiments, the subject may press a key on a keyboard instead.

In preferred embodiments, a textured surface covers at least a portion of the joystick, where the textured surface includes a plurality of bumps at a specified density and range of bump sizes, together referred to as a specified "bumpiness". In some embodiments, the surface may also be rugose, e.g., may have a ridged or wrinkled texture, e.g., in addition to the bumps.

Figure 3:
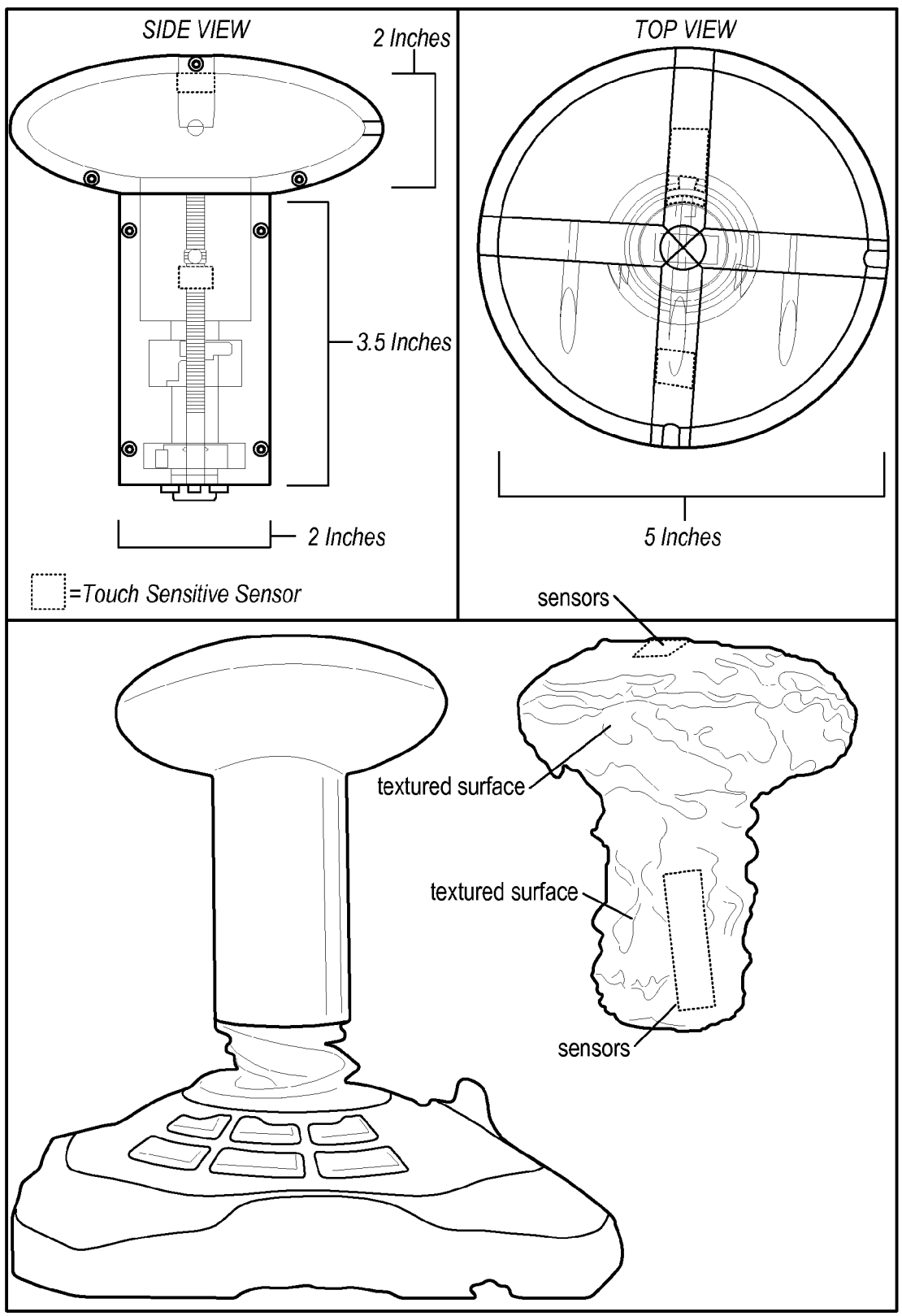
FIG. 3 illustrates a joystick configured according to one embodiment of the present invention.

FIG. 3 illustrates a joystick according to one embodiment of the invention. As may be seen, in this exemplary embodiment, the joystick includes a base, and a shaft coupled to the base, where the shaft includes a neck and a bulb. This particular joystick is an adaptation of an off the shelf (OTS) force feedback joystick, where the shaft of the OTS joystick has been removed and a custom fabricated shaft (CFS) substituted in its place. The CFS is fabricated from ABS plastic and is mushroom-shaped with a shaft length of 3.5 inches, a diameter of 2 inches, and bulb dimensions of 2 inches deep and with a top diameter of 5 inches. The shaft is equipped with two touch sensitive sensors on the bulb and two touch sensitive sensors on the neck. The touch sensors are located on opposite sides of the shaft. The purpose of the touch sensor(s) is to be able to detect when and where subjects engage (and disengage) the joystick.

As FIG. 3 also shows, in this embodiment, a rugose sleeve covers the ABS plastic shaft. The term rugose refers to sunken grooves surrounded by elevated ridges or wrinkles. The rugose sleeve was fabricated from a mixture liquid mold rubber and liquid latex, and the mixture poured over a tin foil casting to create a wrinkled surface with sunken grooves. A hot glue gun was then used to create bumps. After the glue has dried and hardened, the latex-rubber mixture is then poured over the bumps to create a durable surface. Finally, textured paint is applied over the sleeve to create another level of texture. While the above describes one exemplary way to generate the textured surface of the joystick, it should be noted that any other techniques may be used as desired, so long as the resulting surface is controllably bumpy and/or rugose.

A primary use and benefit of the joystick is for subjects to effect many, e.g., possibly thousands of, engaging/disengaging hand postures on a surface with an enriched robust tactile surface. For example, in preferred use of the joystick, e.g., in a brain training exercise, the subject is required to use the joystick to move a cursor to one or more targets in succession, releasing the joystick (disengaging) after each target is reached, and reengaging the joystick for the next target, thereby repeatedly reintroducing the subject's hand to the tactile stimulation of the bumps (and possibly a rugose surface) to cultivate or encourage the brain to establish or reestablish fine sensory and motor function with respect to the subject's hand. Further description of exemplary training exercises are presented below.

Note that while the embodiment of FIG. 3 includes touch-sensitive sensors for detecting or indicating when (and where) the subject has disengaged with the joystick, i.e., released the joystick, in other embodiments the joystick may not include sensors, and the disengagement may be indicated by the subject pressing a key or button on the keyboard of the computer or, for example, on the base of joystick, with the hand that is operating the joystick. In other words, the subject may be required to release the joystick shaft and press a key on the keyboard or the joystick base (which is presumably not possible to achieve without letting go of the joystick), thereby indicating that subject has disengaged with the joystick. Note that in other embodiments, other means or techniques for indicating or facilitating disengagement of the joystick may be used as desired.

As indicated above, the rationale for using a haptic joystick is to stimulate competing inputs and awaken the degraded portions of the neural representations of the hand. In providing this enriched tactile environment, it is important to adapt the textured surface of the joystick so as to introduce additional enrichment. Thus, in some embodiments, the joystick may facilitate modification of the surface to change the specified bumpiness and/or rugosity of the joystick. For example, in some embodiments, modular surface patches with different levels of bumpiness may be provided, e.g., one modular patch per level of bumpiness.

Figure 4:
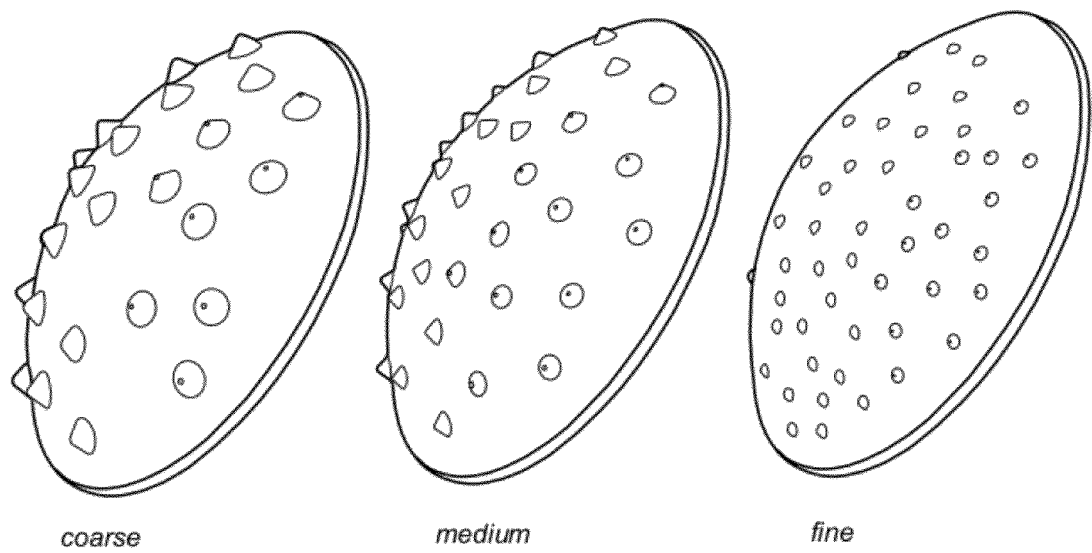
FIG. 4 illustrates surfaces of differing bumpines, according to one embodiment.

FIG. 4 illustrates a set of three exemplary surface patches that may be used to implement differing, e.g., progressive, levels of bumpiness for the joystick, where, for example, the patches may be (temporarily) affixed to the joystick, e.g., the bulb of a joystick such as that of FIG. 3. Of course, in other embodiments, the patches may have various different shapes, and may be attached to different portions of the joystick, e.g., flexible patches that wrap around the shaft of the joystick, sleeves that cover most if not all of the joystick shaft, etc.

Figure 5:
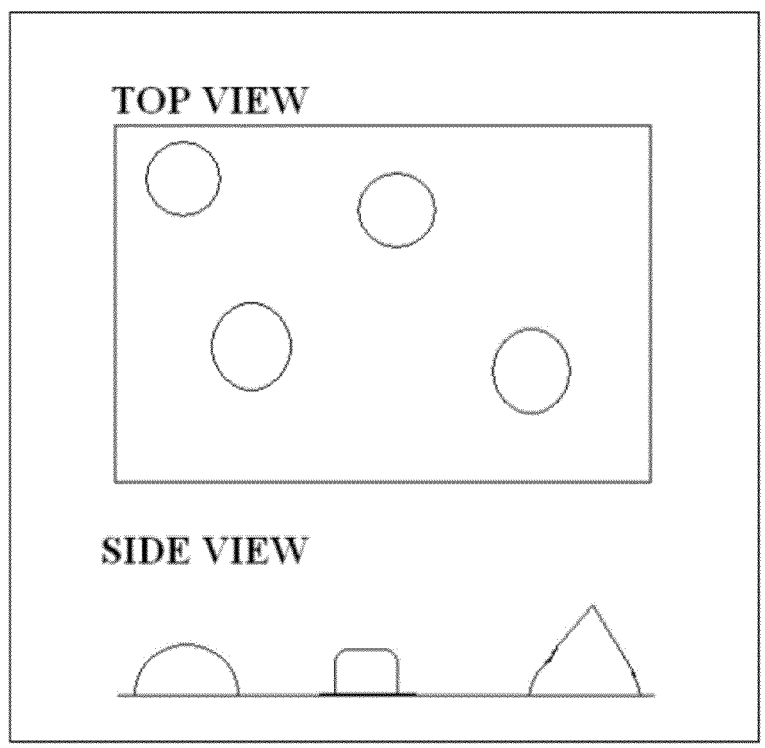
FIGS. 5-7 illustrate coarse, medium, and fine levels of bumpiness, according to one embodiment.
Figure 6:
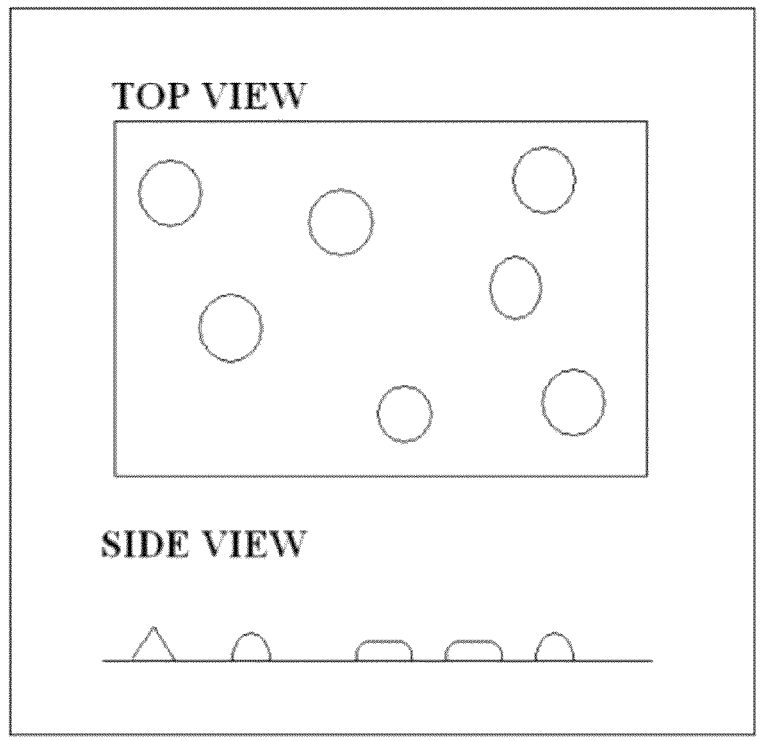
Figure 7:
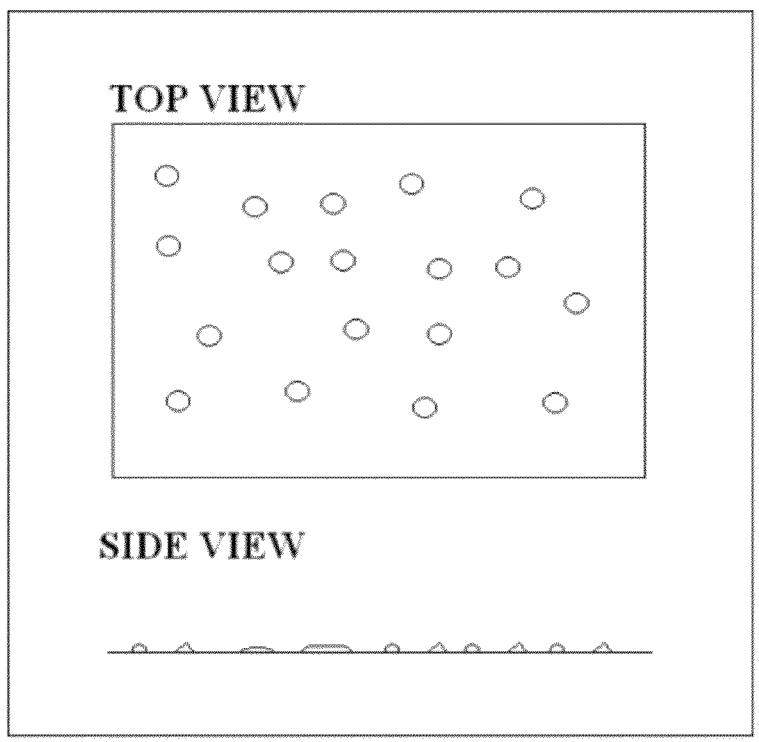

As FIG. 4 shows, in this embodiment, three surface patches are shown, with coarse, medium, and fine levels of bumpiness. Note that the bump density varies inversely with the average size of the bumps, i.e., the larger the bumps are on average, the lower the density of bumps. FIGS. 5-7 illustrate representative top and side views of coarse, medium, and fine bumpiness, respectively, according to one exemplary embodiment. As may be seen, the bumps for a given level may be of different shapes and even of different sizes, although the range of bump sizes may be specific to the level. Note that in FIG. 5, which illustrates coarse bumpiness (e.g., level 1), the surface has large protrusions that are widely spaced. In FIG. 6, which illustrates medium bumpiness (e.g., level 2), the surface has more bumps than the coarse surface (level 1) and the bumps are more densely packed. Finally, in FIG. 7, which illustrates fine bumpiness (e.g., level 3), the surface has even smaller bumps that are even more densely packed. It should be noted, however, that the described three levels of bumpiness are meant to be exemplary only, and that any number of levels may be used as desired. In some embodiments, surface patches (and/or sleeves) may also be provided with varying degrees of rugosity, where, for example, the density and size of the wrinkles or ridges is specified per level. For example, in some embodiments, a number of removable sleeves (e.g., three) made of a combination of rubber and latex may be provided, where each sleeve has a different level of rugosity (and/or bumpiness), which affords a possibility of multiple (e.g., three) levels of progressions. However, the exact progressions for the joystick may be dependent on the particular exercise for which it is being used.

Thus, in some embodiments, the joystick may be adapted during an exercise to include various (progressive) levels of bumpiness and/or rugosity. Exemplary exercises using embodiments of a haptic joystick are now described.

Training Exercises Utilizing a Joystick

The following describes exemplary exercises where the subject interacts with the exercise via a joystick, such as those described above, according to one embodiment.

Figure 8:
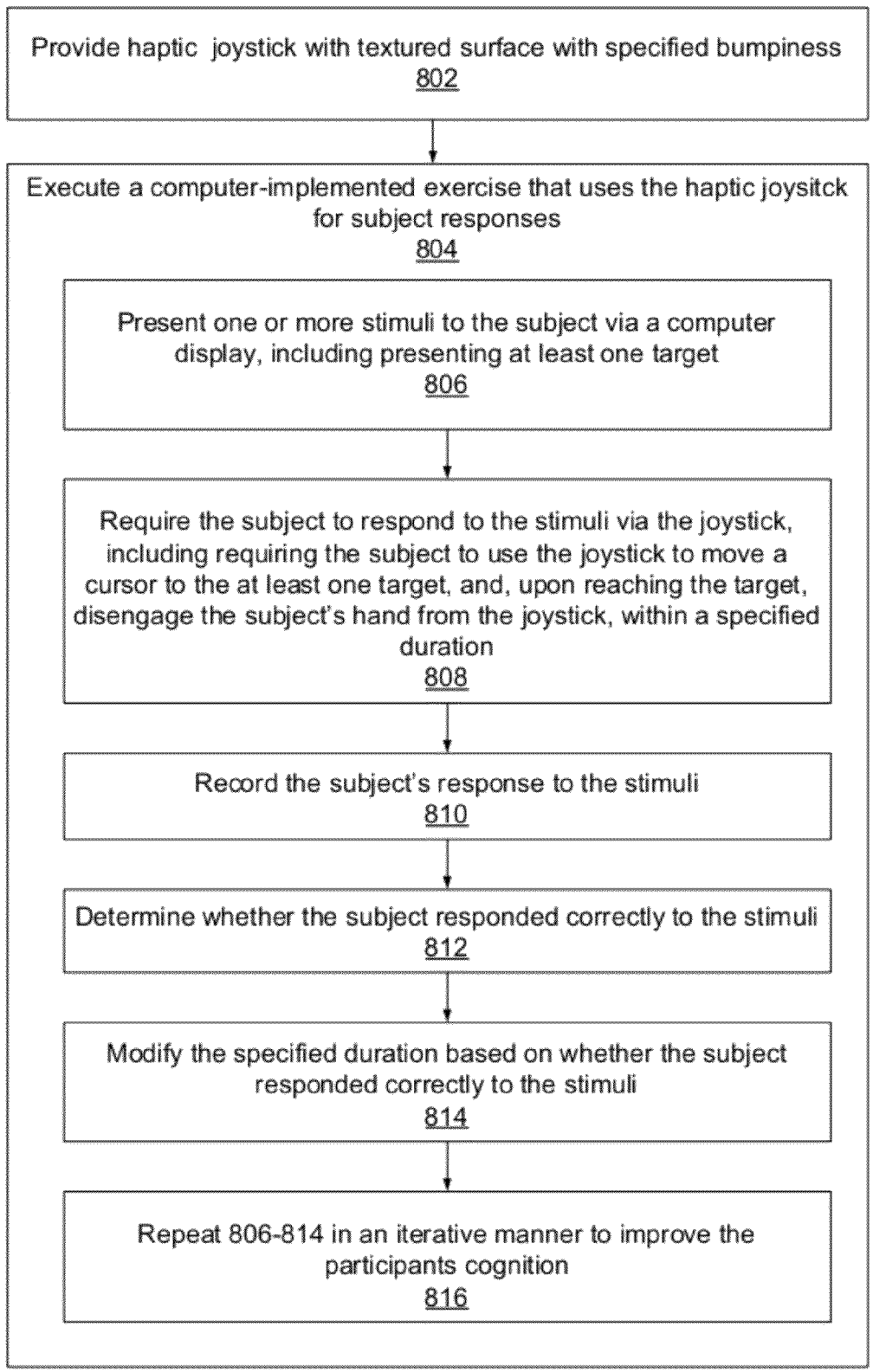
FIG. 8 is a high level flowchart of one embodiment of a method for improving sensory-guided fine motor control of the hand of a subject.

FIG. 8 is a high level flowchart of one embodiment of a method for improving tactile sensitivity and precision and accuracy of motor control of the hand of a subject, e.g., sensory-guided fine motor control of the hand of a subject, utilizing a computing device to present stimuli to the subject, and to record responses from the subject. Moreover, in some embodiments, the method includes determining a psychophysical threshold for the subject. Note that in various embodiments, some of the method elements may be performed concurrently, in a different order than shown, or may be omitted. Additional method elements may also be performed. As shown, the method may operate as follows:

In 802, a joystick may be provided, such as an embodiment of the haptic joystick described above with respect to FIGS. 3-7.

The joystick may include a base, a shaft movably coupled to the base, and a textured surface covering at least a portion of the joystick, where the textured surface has a specified level of bumpiness. For example, in one embodiment, the specified bumpiness includes a plurality of bumps at a specified density and range of bump sizes. Such a joystick may be referred to as a haptic joystick. In some embodiments, the joystick may also include one or more sensors coupled to the shaft, and configured to detect engagement of the subject's hand with the joystick.

The joystick may be communicatively coupled to the computing device, and configured to provide commands to the computing device, e.g., cursor positioning commands, and in some embodiments, sensor data regarding engagement/disengagement of the subject's hand with the joystick.

In 804, a computer-implemented exercise may be executed, i.e., performed. Method elements 806-816 disclose embodiments of the performance of the exercise. After the general description of the exercise, two examples of specific exercises using a haptic joystick are described, although it should be noted that these exercises are meant to be exemplary only, and are not intended to limit the exercises contemplated to any particular form, function, or appearance.

As indicated in 806, executing the exercise may include presenting one or more stimuli to the subject via a computer display, including presenting at least one target. In other words, one or more targets may be displayed on the computer display, e.g., a graphical shape, symbol, or icon, among others. As will be described below in more detail, in preferred embodiments, a trial in the exercise may include a series of targets, although in other embodiments, a trial may only present a single target.

In 808, the subject may be required to respond to the stimuli via the joystick, including requiring the subject to use the joystick to move a cursor to the at least one target, and, upon reaching the at least one target, disengage the subject's hand from the joystick, including disengaging the hand from the textured surface of the joystick. In embodiments where multiple targets are presented in succession, to complete a trial, the subject may be required to move the cursor to each target, and, upon reaching each target, disengage the subject's hand from the joystick, before resuming the trial, i.e., before moving the cursor to the next target. In preferred embodiments, the subject may be required to perform the moving and reaching within a specified duration. In other words, the subject may be required or expected to complete the trial within a specified time period. As will also be described in more detail below, in some embodiments, e.g., depending on the particular exercise being performed, additional constraints may be imposed in a trial. For example, in some embodiments, the subject may be required to follow specified paths to reach the targets, where the subject is penalized if the cursor deviates from the path, e.g., by failing the trial if the subject leaves the path some specified number of times. Such an exercise is described below.

In 810, the subject's response to the stimuli may be recorded. For example, a record may be kept regarding whether the subject properly reached each target (and disengaged the joystick) within the specified duration. In some embodiments, the recorded information may include additional data, such as, for example, how long the subject took to complete the trial, when and what errors the subject made, the stimuli presented, the difficulty of the trial, etc., as desired.

In 812, a determination may be made as to whether the subject responded correctly to the stimuli. For example, the method may determine whether the criteria for passing the trial were met, e.g., whether the subject correctly reached each target in the trial within the specified duration, and properly disengaged the joystick after reaching each target. As noted above, in some embodiments, additional constraints may be imposed, and so the determination may also be made with respect to performing the trial within the given constraints.

In some embodiments, an indication, e.g., a graphical and/or audible indication, may be provided to the participant indicating the correctness or incorrectness of the participant's response, e.g., a "ding" or a "thunk" may be played to indicate correctness or incorrectness, respectively, and/or points may be awarded (in the case of a correct response). Of course, any other type of indication may be used as desired, e.g., graphical images, animation, etc. Thus, the subject may be presented with a reward and/or punishment (or simply information) based on the subject's performance.

In 814, the specified duration may be modified based on whether the subject responded correctly to the stimuli. Said another way, the duration may be adaptively adjusted based on the subject's performance in a trial. For example, in one embodiment, modifying the duration based on the subject's response may include increasing the duration if the subject responds incorrectly, and decreasing the duration if the subject responds correctly. Thus, the task may be made easier or more difficult by changing the duration of the trial.

In one embodiment, the duration (of the trials) may be modified in accordance with a maximum likelihood procedure, such as a QUEST (quick estimation by sequential testing) threshold procedure, and/or a ZEST (zippy estimation by sequential testing) threshold procedure, described in more detail below, although other threshold procedures may be used as desired.

Alternatively, or additionally, in some embodiments, other schemes may be employed to adjust the difficulty of the presented stimuli, e.g., to adjust the stimulus and/or its presentation, e.g., the duration. For example, in some embodiments, an N-up/M-down procedure may be used, where the duration may be increased if the subject incorrectly performs N trials consecutively, decreased if the subject correctly performs M trials consecutively. For example, in one embodiment, the N-up/M-down procedure may be a 1-up/3-down procedure, where if the subject incorrectly performs 1 trial, the duration is increased, and if the subject correctly performs 3 trials in succession, the duration is decreased, although it should be noted that any other values (for N and M) may be used as desired. As another example, the stimuli and/or their presentation may be modified by a clinician or attendant, e.g., the system may receive user input from the clinician modifying the duration, e.g., via a GUI. In this case, the clinician may monitor the subject's performance, and modify the duration as appropriate, e.g., according to a specified adaptive scheme or rules.

As noted above, in other embodiments, other attributes of the stimuli and/or presentation may be modified as desired.

Thus, for each trial, the duration for that trial may be determined by the performance of the previous trial, or of a plurality of previous trials, as will be discussed below. In other words, the subject's response to the stimulus, or to previous stimuli (e.g., correctly performing n trials consecutively), may determine the next duration, e.g., via a maximum likelihood method, or, as described above, the duration may be adaptively adjusted based on the subject's performance over a series of trials, e.g., based on the most recent n trials, where n is a specified integer value. Note that in various other embodiments, other duration modification schemes may be used as desired.

Finally, in 816, the presenting, requiring, recording, determining, (and in some embodiments, the indicating) and modifying may be repeated a plurality of times in an iterative manner to improve tactile sensitivity and precision and accuracy of motor control of the hand of a subject, e.g., sensory-guided fine motor control of the hand. In other words, the method may include performing a plurality of trials using a variety of durations determined based on the subject's response to enhance the subject's tactile sensitivity and precision and accuracy of motor control of the hand. For example, in preferred embodiments, the repeating may be performed over a plurality of sessions, where the repeating occurs a specified number of times each day, for a number of days. Exemplary exercise schedules are provided below It should be noted that in some embodiments, other modifications to the stimuli and/or stimuli presentation attributes may be employed, including, for example, constraints or criteria against which the subject's responses may be judged, e.g., target size, distance between successive targets, required paths to reach the targets, etc., where each set of attributes (values) may be referred to as a condition. For example, in one embodiment, a condition, i.e., one or more attributes (e.g., other than duration) may be modified according to a predetermined sequence or schedule of values, e.g., increasing the difficulty of the trials as the subject progresses through the exercise. Examples of such progressive modification of attributes are provided below. Of course, in other embodiments, any other stimulus modification schemes or approaches may be used as desired. For example, rather than just using specified values of attributes, attributes may be varied according to specified increments (or decrements). As another variation, some progressive attributes may also be modified adaptively, i.e., based on the subject's response. Examples of specified conditions are described below with respect to two exemplary exercises.

Thus, in some embodiments, the repeating may include performing trials under each of a plurality of conditions, where each condition specifies the stimuli and/or their presentation, possibly including attributes of the joystick, and where the conditions become more difficult as the subject progresses through the exercise. Each condition may thus specify some combination of attributes of the trials. Based on performance, the subject may progress through the exercise, performing trials under a series of conditions, where, over the course of the exercise, the conditions may make the trials more difficult. In some embodiments, the subject may progress through various levels or stages, e.g., where the lower levels or stages involve trials under easier conditions, and later levels or stages involve trials under more difficult conditions.

In some embodiments, the progression through the plurality of conditions may be specified, where, for example, the subject must finish level 1 before proceeding to level 2, and so forth. In other embodiments, the subject may perform trials under different sequences of conditions, where, for example, the subject may complete one sequence that progresses from easy to difficult trials, then perform trials under another sequence of conditions, also ranging from easy to difficult, and so forth. In other words, in some embodiments, progress through the various conditions may not be linear, but may involve "looping back", repeating, and so forth, among the conditions. Said another way, the various conditions may form a complex grid of trial conditions, rather than a simple linear sequence of conditions, where trials may be performed in various sequences of conditions with particular variations of attributes. This non-linear variation of trial attributes (e.g., stimulus, stimulus presentation, joystick attribute(s), and/or trial criteria attributes) may facilitate a deeper and broader training experience for the subject.

In preferred embodiments, indications may be provided as to whether the subject responded correctly to the stimuli. For example, in one embodiment, if the subject correctly moved the cursor to one or more targets in succession within the specified duration, disengaging the joystick upon reaching each target, they have correctly responded to the trial, and a score indicator may increment, and a "ding" may be played to indicate a correct response. If the subject responds incorrectly, e.g., fails to move the cursor to each target in the specified duration, fails to release the joystick, etc., then they have incorrectly responded to the trial, and a "thunk" may be played to indicate an incorrect response. Of course, any other type of indication may be used as desired, e.g., graphically and/or audibly. Similarly, if the subject correctly performs a specified number of trials consecutively, an indication, e.g., graphical and/or audial, may be provided to the subject. Moreover, in some embodiments, bonus points may be awarded for such success.

Exemplary Exercises

In the above-described exercise the subject is required to move a cursor to various locations on a display screen. The input device used is a haptic joystick, embodiments of which are described above, where the joystick has a specified bumpiness (and/or rugosity). The subject is required to move his or her hand on and off the joystick many times to stimulate different regions of the hand. In embodiments where the joystick includes touch sensors, this disengagement may be determined automatically by the joystick. In other embodiments, e.g., where the joystick has no button, to disengage, the subject may move his or her hand from the joystick (e.g., from the bumpy or rugous surface of the joystick) to a button key, after which the subject may re-engage the joystick to move the cursor to the next target.

While the above describes a general type of exercise that utilizes the haptic joystick, many variations of the exercise are possible and contemplated. The below describes embodiments of two exemplary exercises that utilize the joystick described herein to improve tactile sensitivity and precision and accuracy of motor control of the hand of a subject, although it should be noted that the two exercises described herein are not intended to limit the exercises useable with the joystick according to the techniques described above to any particular form, function, or appearance.

Bubble Smash is a rapid aiming task that serves two primary purposes. The first purpose is to provide a training program where rapid and progressively accurate reaching movements are required. The second purpose is to provide a robust tactile input while performing this task (via the haptic joystick). Path Finder is a manual pursuit task designed to train the accuracy of graded controlled reaching and grasping. Note that in various embodiments, the different exercises may be performed and managed separately, or may be implemented as tasks within a single exercise, as desired.

In one exemplary embodiment, the training may include ten one-hour sessions, where the subject completes five 10-minute segments per session, with a total of 50 training segments. The program may include in-built "under-the-hood" assessments that are similar to the training trials. The training may begin with one or more, e.g., 2, assessments to determine a measure of baseline performance on the exercises. These assessments may be repeated at two or more, e.g., three, intervals during training and at the end of training. As discussed above, the adaptive dimension for all trials is the time given to complete the trial, where the time (duration) is modified using an adaptive algorithm, e.g., the Zest adaptive algorithm. Of course, the above schedule is exemplary only, and any other scheduling may be used as desired.

Bubble Smash

As mentioned above, Bubble Smash is a training program where rapid and progressively accurate reaching movements are required using a haptic joystick. In Bubble Smash, subjects control a cursor with the joystick. A trial begins with the subject disengaging (letting go of the joystick, and possibly pressing a button), reengaging the joystick, placing the cursor over a START button, and moving the cursor toward a target bubble. The goal is to move the cursor from one bubble to another as quickly as possible and disengage the joystick once the cursor is over the bubble (termed "smash"). One bubble at a time appears on the screen. After the subject smashes a bubble, the next bubble appears. A trial consists of some specified number of bubbles, e.g., ten bubbles, where a limited amount of time is allotted to smash all the bubbles. A trial is terminated when either the subject smashes all the bubbles or the time allotment expires.

Figure 9:
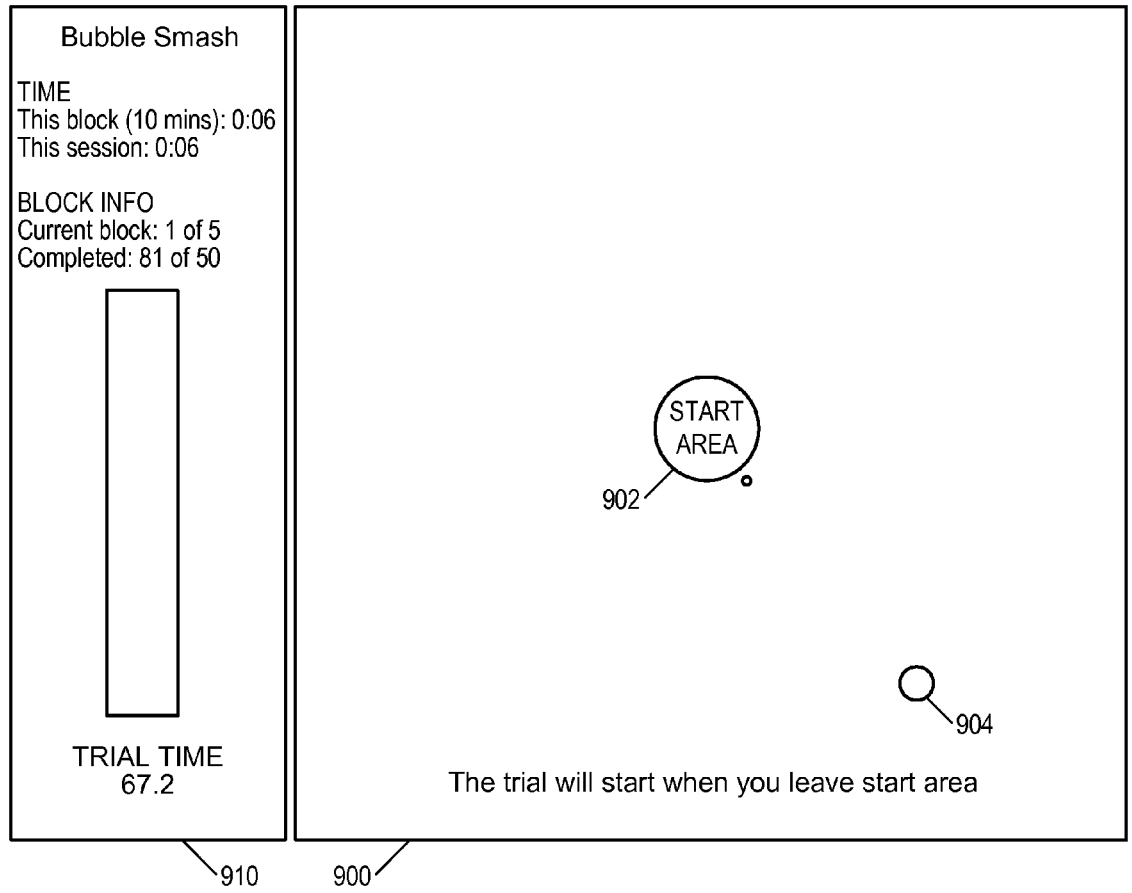
FIG. 9 illustrates an exemplary screenshot of a graphical user interface (GUI) for the Bubble Smash exercise, according to one embodiment.

FIG. 9 illustrates an exemplary screenshot of a graphical user interface (GUI) for the Bubble Smash exercise, according to one embodiment. As may be seen, the interface includes a playing area 900, and a performance indication area 910, although other interfaces may be used as desired. As FIG. 9 shows, initially, a start area 902 (shown labeled "Start Area") may be displayed in the playing area. The subject is required to move the cursor out of the start area 902 and then to each of a series of one or more targets, in this particular embodiment, circles (bubbles), shown in FIG. 9 as a small circle 904 in the bottom right portion of the playing area 900.

In one embodiment, when the cursor is inside a circle for at least some specified time interval, e.g., at least 0.5 seconds, the circle may indicate that that target has been reached, e.g., by turning green, making a sound, etc., and the subject must disengage (let go of) the joystick to proceed. The reason for this "resident time" in the circle is to preclude counting the subject's accidentally running over the circle with the cursor as deliberately reaching the target.

As noted above, if the joystick has touch sensors, simply releasing the joystick may suffice to disengage; but if no sensors are used, the subject may be required to release the joystick and press a button or key, e.g., on the joystick (e.g., the base of the joystick), or on a keyboard of the computing device, the idea being that the subject must release the joystick to press the button or key.

In one embodiment, an animation or other visual (and/or audio) effect may be presented to indicate that the bubble has been "smashed". Once the subject has disengaged (from) the joystick, another circle in the series may be presented, and so forth, until all the bubble in the trial have been smashed. When the subject has 'smashed' all circles (bubbles) the trial is over. If the trial is done within the allowed time (the specified duration), the trial is successful. Note that in preferred embodiments, the next circle is presented only after the current circle is smashed.

In one embodiment, for each trial, the bubbles positions may be pseudo-randomly presented so that the optimal cursor travel distance is substantially the same for each trial (e.g., within some specified tolerance, e.g., within 5-10%. Examples of pseudo-random sequences include low discrepancy sequences, such as Halton sequences, which are pseudo-random deterministic sequences.

As described above, over the course of trials in the exercise, the duration for each trial may be adaptively modified based on the subject's response; moreover, as the subject progresses through the exercise, various other attributes may be modified in accordance with the subject's progress, referred to collectively as conditions. Examples of such progressively modified attributes include, but are not limited to, target size, number of targets, distance to next target, or, in the terms of Bubble Smash, diameter of the circles (bubbles), number of circles, and length of distance to travel to the next circle. Thus, in some embodiments, the subject may be required or expected to move to and smash longer and longer series of smaller and smaller bubbles, and the successive bubbles may be placed further from each other, as the exercise progresses. Note that in other embodiments, the progressively modified attributes may include any of the above, and/or additional attributes, as desired. For example, as noted above, the progressively modified attributes may include bumpiness and/or rugosity of the textured surface of the joystick.

Thus, Bubble Smash may include both adaptive and progressive dimensions that may be modified over the course of the exercise. The adaptive dimension, specifically, the time allotment (duration) allotted to smash all bubbles in the trial, preferably adapts based on a maximum likelihood procedure, e.g., a ZEST algorithm, where successful trials result in a decreased allotment of time and unsuccessful trials result is an increased allotment of time. In theory, subjects will be training at their speed threshold each trail. Since speed and accuracy are integrally related, subjects should become more accurate as they become faster at moving the joystick because the way to improve speed is to be more accurate in the movement. The progressive dimensions are modified based on a time-based progression where stimuli adapt on a schedule irrespective of how the subject is performing.

Figure 10:
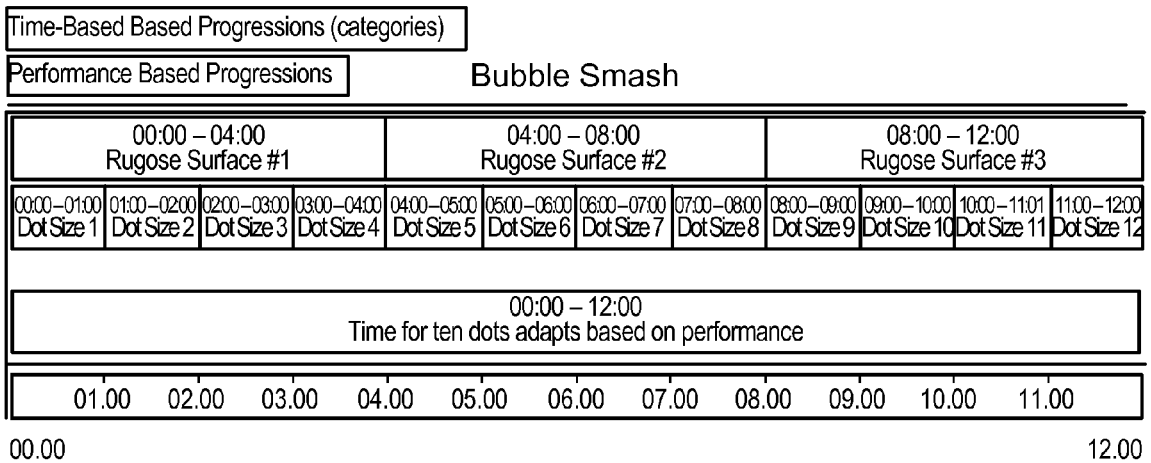
FIG. 10 illustrates an exemplary schedule for the Bubble Smash exercise, where rugosity and dot size are the progressive attributes, according to one embodiment.

FIG. 10 illustrates an exemplary schedule for Bubble Smash, where rugosity and dot size are the progressive attributes, although any other progressive attribute may be used as desired, e.g., bumpiness. According to this example schedule, for each of three levels of rugosity, subjects will play Bubble Smash for 20 minutes each training day for a total of 240 minutes or 4 hours, after which the rugosity may be changed, e.g., by switching out a textured surface patch or sleeve on the joystick. Thus, the level of rugosity may change twice during the 12 hours of training, e.g., the rugose sleeve may be changed after 4 and 8 hours of training, changing from large widely spaced bumps to small densely packed bumps, as illustrated by FIGS. 4-7, and discussed above.

Figure 11:
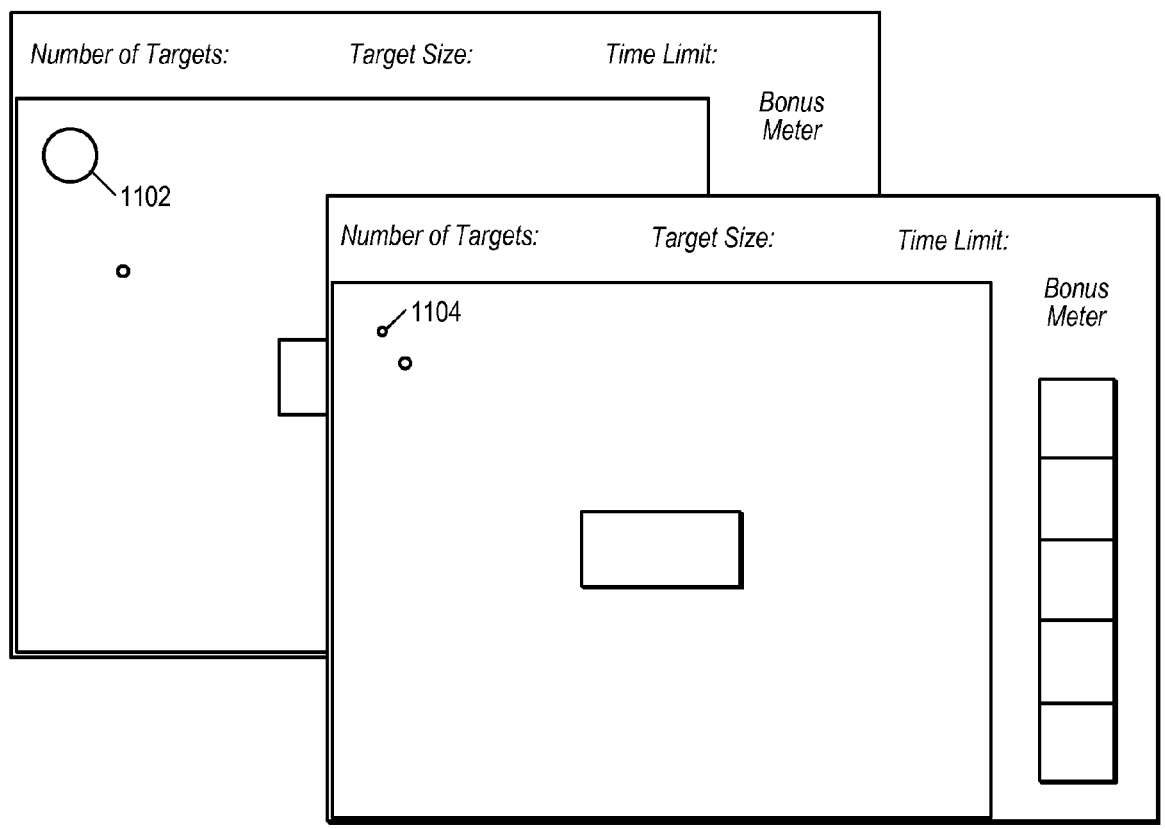
FIG. 11 illustrates largest and smallest bubbles for the Bubble Smash exercise, according to one embodiment.

According to this exemplary schedule, target size, e.g., dot or circle size, is also progressively modified. For example, there may be 12 different sizes of bubbles in Bubble Smash. FIG. 11 shows the largest size (bubble 1102) and smallest size (bubble 1104), according to one embodiment. According to Fitt's Law, accuracy and speed are integrally related where increased accuracy results in decreased speed and vice versa. Therefore, as accuracy demands increase (or as the target becomes smaller) subjects will naturally move slower in response to increased accuracy demands.

Thus, in one embodiment, in order to improve speed and accuracy, the dot diameter may be 5 pixels smaller each day (progressing from Dot Size 1 through Dot Size 12 over the course of the exercise). Thus, after 12 days of training, the dot will be 60 pixels smaller than on the first day.

As the example schedule also indicates, and as described above, the duration, i.e., the time allotted to smash all the targets in a trial (e.g., ten) may be adaptively modified based on the subject's performance. Note that since the time allotment or duration may adapt based on performance, each trial may be performed at a duration threshold irrespective of dot size, e.g., per ZEST. In theory, accuracy and speed should be improved by the end of training.

Returning again to FIG. 9, in some embodiments, feedback regarding the current trial and/or the subject's progress in the exercise may be displayed in the performance indication area 910. As shown, in this embodiment, a graphical and numeric timer is displayed indicating to the subject the time remaining in the current trial. Additionally, information regarding a current block and session may be displayed, where, as may be seen in FIG. 9, the current session includes 5 blocks, of which the current block is the first. In some embodiments, a trial indicator may also be displayed, e.g., indicating the subject's progress through a total number of trials, e.g., for a block, session, or even the entire exercise. Of course, in other embodiments, the GUI may display any other attributes as desired, e.g., a score, number of trials passed and/or failed, values of progressive and/or adaptive attributes, and so forth.

Note that in preferred embodiments, each exercise or task includes instructions that may be presented to the subject prior to beginning, and, in some embodiments, which the subject may invoke at any time. Additionally, in some embodiments, one or more practice trials may be performed prior to beginning training to familiarize the subject with the exercise or task, and what is expected of the subject.

Path Finder

Figure 12:
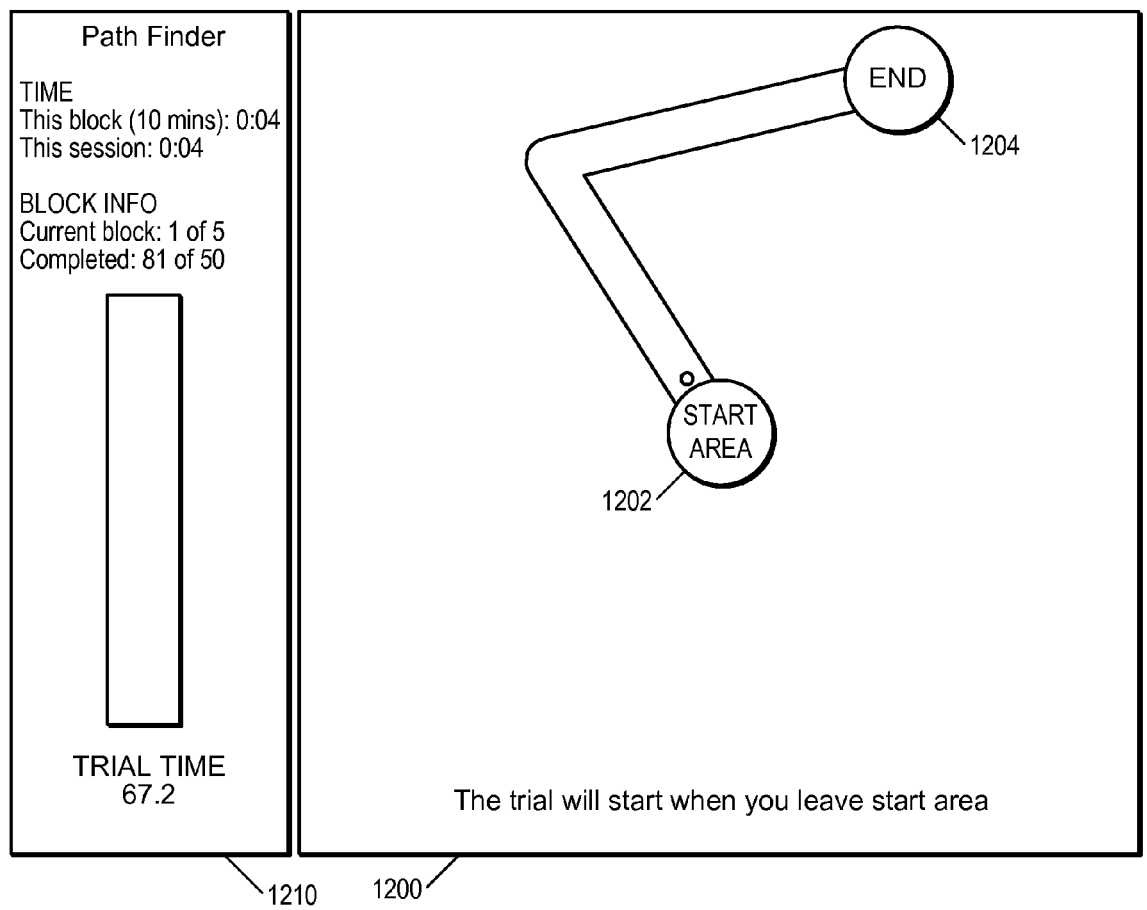
FIG. 12 illustrates an exemplary screenshot of a GUI for the Path Finder exercise, according to one embodiment.

As noted above, Path Finder is a manual pursuit task designed to train the accuracy of graded controlled reaching and grasping. FIG. 12 illustrates an exemplary screenshot of a GUI for the Path Finder exercise, according to one embodiment. Similar to Bubble Smash, in this exemplary embodiment, the interface includes a playing area 1200, and a performance indication area 1210. The task is to move the cursor out of the start area 1202 to a series of one or more targets (e.g., circles) via specified paths, and without hitting the path borders. In the simple example shown in FIG. 12, the target is a circle 1204 in the top right portion of the playing area 1200, and labeled "End" (indicating that this is the terminus of the path). Note that in this exemplary trial, the specified path has a bend or "elbow" that makes staying within the path borders more difficult.

Similar to Bubble Smash, in some embodiments, "reaching the target" may require the cursor being on or inside the target (e.g., inside the circle) for at least some specified time interval, e.g., at least 0.5 seconds, after which the target may indicate that it has been reached, e.g., by turning green, making a sound, etc. In some embodiments, upon successfully reaching the target, the subject must disengage (let go of) the joystick to proceed.

Figure 13:
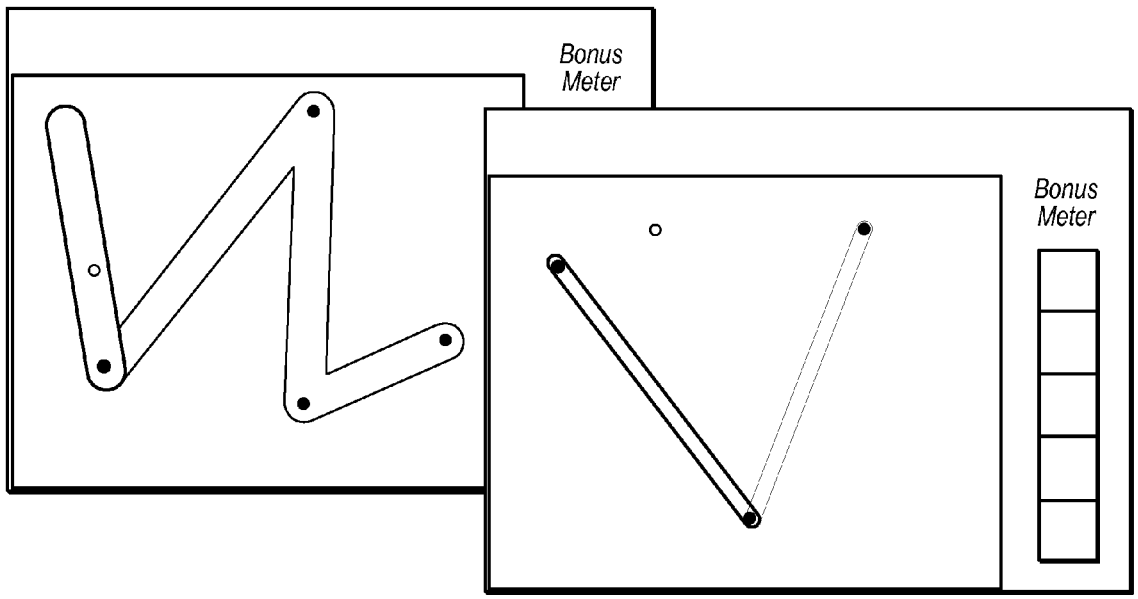
FIG. 13 illustrates further exemplary screenshots from the Path Finder exercise, according to one embodiment.

FIG. 13 illustrates further exemplary screenshots from the Path Finder exercise, according to one embodiment. In the embodiments shown in FIG. 13, to initiate a trial, the subject positions the cursor over a target that is contained within a path (right screenshot). The subject disengages the joystick while the cursor is on the target. When this happens, the path turns green indicating the path to the next target (left screenshot). Once the subject reaches the next target and disengages the joystick, the next segment lights the path to the next target. This pattern repeats until the subject reaches the final target. If the subject deviates from the path, they are penalized. Conversely, if they complete a trial without deviating from the path, they are rewarded with a bonus. Of course, the above description is meant to be exemplary only, and the exercise elements, rules, appearance, punishments, and rewards may be different, as desired.

Said another way, once the subject has disengaged (from) the joystick, another target (e.g., circle) in the series may be presented with a path (which may also be referred to as a path segment or "arm") leading from the current (reached) target to the new target, and the subject may proceed as described above, until all the targets in the trial have been reached via their respective paths. If the trial is completed within the allowed time (the specified duration), and all other passing criteria are met, e.g., not hitting the borders more than some specified number of times (e.g., zero), the trial is successful. Note that in preferred embodiments, the next target and path are presented only after the current target has been reached.

As with Bubble Smash, in one embodiment, for each trial, the target positions may be pseudo-randomly presented so that the optimal cursor travel distance is substantially the same for each trial (e.g., within some specified tolerance, e.g., within 5-10%.

In various embodiments, Path Finder may utilize both adaptive (performance-based) and progressive (e.g., time or session based) attribute modifications. For example, in one embodiment, an adaptive attribute may be the width of the path to be navigated. This dimension may adapt based on a ZEST algorithm where successful trials result in a decreased path width and unsuccessful trials result increased path width. In other words, in some embodiments, the width of the path may be adjusted based on a maximum likelihood procedure, e.g., a ZEST algorithm, where the path between targets gets narrower in response to successful trials and wider in response to unsuccessful trials. A successful trial may be defined as "smashing" each target without deviating from the indicated path. If the subject deviates from the path (e.g., more than some specified number of times, e.g., zero), the trial may be considered unsuccessful.

As described above, in some embodiments, in addition to, or instead of, path width, over the course of the exercise, the duration for each trial may be adaptively modified based on the subject's response. Moreover, as the subject progresses through the exercise, various other attributes may be progressively modified in accordance with the subject's progress through the exercise, thus providing a plurality of conditions under which trials are performed.

In various embodiments, the parameters that may be progressively modified as training progresses may include one or more of: width of the path, number of corners (turns or elbows) in a path, length of distance to travel, and number of border hits (e.g., deviations from the path) allowed before a failure. In other embodiments, target-related attributes may also be progressively modified, e.g., target size, number of targets, and distance to next target. Thus, in some embodiments, the subject may be required or expected to move to targets via narrower paths, with increasing numbers of turns or elbows, as the exercise progresses. Additionally, in some embodiments, the targets may be increasingly smaller, and the successive targets may be placed further from each other. Note that in other embodiments, the progressively modified attributes may include any of the above, and/or additional attributes, as desired.

As described above with respect to Bubble Smash, and as illustrated in FIG. 12, in some embodiments, the GUI for Path Finder may provide feedback regarding the current trial and/or the subject's progress in the exercise may be displayed in the performance indication area 1210.

Figure 14:
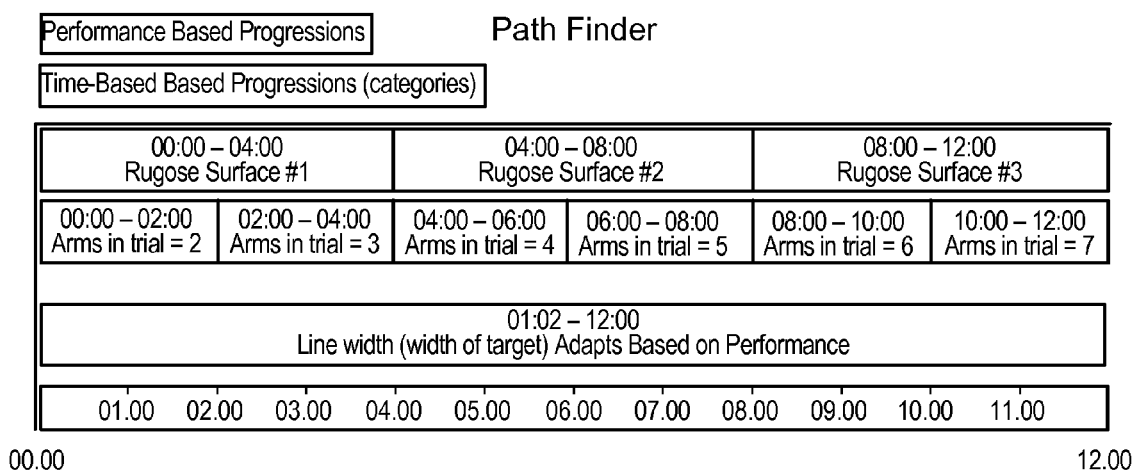
FIG. 14 illustrates an exemplary schedule for Path Finder, where rugosity and "arms in trial", i.e., number of straight segments coupled by turns or elbows in the path, are the progressive attributes, according to one embodiment.

FIG. 14 illustrates an exemplary schedule for Path Finder, where rugosity and "arms in trial", i.e., number of straight segments coupled by turns or elbows in the path, are the progressive attributes, although any other progressive attribute may be used as desired, e.g., bumpiness. According to this example schedule, for each of three levels of rugosity, subjects will play Path Finder for 20 minutes each training day for a total of 240 minutes or 4 hours, after which the rugosity may be changed, e.g., by switching out a textured surface patch or sleeve on the joystick. Thus, the level of rugosity may change twice during the 12 hours of training, e.g., the rugose sleeve may be changed after 4 and 8 hours of training, changing from large widely spaced bumps to small densely packed bumps, as illustrated by FIGS. 4-7, and discussed above.

According to this exemplary schedule, arms in trial, e.g., number of straight segments coupled by turns or elbows in the path, is also progressively modified. This dimension may adapt or be modified every other day. Thus on day one and day two, there may be two arms (three targets, one elbow) in each trial. On day two and three, there may be three arms (four targets, two elbows) in each trial. This progression may continue until the last day, when there will be seven arms, eight targets and six elbows.

The example schedule of FIG. 14 also indicates the adaptive modification of path width (referred to in the schedule as "line width (width of target), described above, although in other embodiments, duration (or any other attribute) may be adaptively modified instead of, or in addition to, path width. It should be noted that in other embodiments, any of the various attributes discussed herein may be modified adaptively or progressively, as desired.

Note that this task (or variations thereof) may improve hand function in two distinct ways. The first is to enhance sensory-motor integration via enriched tactile exposure (rugose or bumpy surface patch or sleeve). The second is to enhance the accuracy in which a person is able to transport an object, such as moving a computer mouse or picking moving a cup of water from a table to the subject's mouth.

It should be noted that the particular exercises disclosed herein are meant to be exemplary, and that other repetitionbased training exercises using stimuli with multiple stimulus sets may be used with the disclosed joystick as desired, possibly in combination. Note particularly that such training with a haptic joystick using a variety of such stimulus-based exercises, possibly in a coordinated manner, is contemplated.

Maximum Likelihood Procedures

As is well known, QUEST and ZEST procedures are adaptive psychometric procedures for use in psychophysical experiments, where stimuli are presented to a subject, and where an adaptive parameter or dimension variable of the stimuli is adjusted to a threshold value corresponding to some specified success rate.

The ZEST procedure is a maximum-likelihood strategy to estimate a subject's threshold in a psychophysical experiment based on a psychometric function that describes the probability a stimulus is detected as a function of the stimulus intensity. For example, consider a cumulative Gaussian psychometric function, $F(x-T)$, for a 4-alternative-forced-choice (afc) task with a 5% lapsing rate, with proportion correct (ranging from 0-1) plotted against intensity of the stimulus (ranging from 0-5). As used herein, the term intensity (with respect to stimuli) refers to the value of the adaptive dimension variable being presented to the subject at any particular trial in a particular exercise. For example, in the exercises described herein, the intensity value is the duration (e.g., in log millisecond). In other words, the intensity value is a parameter regarding the trial that may be adjusted or adapted, e.g., to make a trial more or less difficult. The threshold is defined to be the mean of the Gaussian distribution—e.g., a value yielding some specified success rate, e.g., an 85% success rate.

The primary idea of the ZEST procedure as applied to stimulus modification may be described as follows: given a prior probability density function (P.D.F.) centered around the best threshold guess, x, this P.D.F. is adjusted after each trial by one of two likelihood functions, which are the probability functions that the subject will respond "yes" or "no" to the stimulus at intensity as a function of threshold. Since the psychometric function has a constant shape and is of the form $F(x-T)$, fixing the intensity x and treating threshold T as the independent variable, the "yes" likelihood, $p=F(-(T-x))$, is thus the mirror image of the psychometric function about the threshold, and the "no" likelihood function is then simply $1-p$. The P.D.F. is updated using Bayes' rule, where the posterior P.D.F. is obtained by multiplying the prior P.D.F. by the likelihood function corresponding to the subject's response to the trial's stimulus intensity. The mean of the updated (or posterior) P.D.F. is then used as the new threshold estimate and the test is repeated with the new estimate until the posterior P.D.F. satisfies a confidence interval criteria (e.g. standard deviation of posterior P.D.F.<predetermined value) or a maximum number of trials is reached.

In one example of the ZEST procedure, a single trial of a 4-afc experiment is performed, with x=2.5 (intensity) as the initial threshold guess. If the subject responds correctly, the next trial is placed at the mean of the corresponding posterior P.D.F., ~x=2.3; if the response is incorrect, the next trial is placed at the mean of the corresponding P.D.F., ~x=2.65.

Thus, as mentioned above, in some embodiments, a maximum likelihood procedure, such as a ZEST or QUEST procedure, may be used as part of, or in conjunction with, the exercise described herein. For example, as noted above with reference to FIG. 8, the modifying of the duration described in method element 814 may be performed using such a procedure, e.g., a single-staircase ZEST procedure. The procedure may be used to modify or adjust an adaptive parameter, in this case, the duration, to approach and/or maintain a value at which the subject performs at some specified level of success, e.g., 85% correct responses. Thus, as the subject improves, the duration may be modified accordingly, to maintain this level of success.

As another example, a maximum likelihood procedure, e.g., a ZEST procedure, may be used to periodically assess the subject's progress in the exercise. In some embodiments, e.g., for the periodic assessment, a 2-stair ZEST procedure may be employed, where two independent tracks with starting values, preferably, encompassing the true threshold, each running its own ZEST procedure, are randomly interleaved in the threshold seeking procedure. In addition to their individual termination criterion, the difference between the two stairs may also be required to be within a specified range, e.g., the two stairs may be constrained to be a predetermined distance apart.

In some embodiments, for assessments, the mean of two randomly interleaved Zests may be used with estimates made at a threshold level of 50%, and when training, a single Zest may be used with a threshold level of 85%, although other percentages may be used as desired.

In one embodiment, assessment trials may be performed before training begins, and periodically during the exercise, e.g., when the exercise is 25%, 50%, 75%, and 100% complete, thereby determining the subject's progress over the course of the exercise.

It should be noted that, as explained above, in other embodiments, other techniques may be used to modify the stimuli and/or the presentation of the stimuli, such as an N-up/M-down procedure, or via modification by a clinician or attendant.

It should be noted that any of the devices, techniques, parameters, and aspects disclosed above with respect to exercise and assessment methods described herein may be used with respect to any other exercises and assessment methods, as desired. In other words, any of the particular details described above with respect to any specific embodiment may be used with respect to any of the other embodiments disclosed herein as desired, the above descriptions being meant to be exemplary only, and not to restrict embodiments of the invention to any particular form, appearance, or function.

Moreover, although the present invention and its objects, features, and advantages have been described in detail, other embodiments are encompassed by the invention. For example, particular advancement/promotion methodology has been thoroughly illustrated and described for the exercise. The methodology for advancement through the exercise is based on studies indicating the need for frequency, intensity, motivation and cross-training. However, the number of skill/complexity levels provided for in the exercise, the number of trials for each level, and the percentage of correct responses required within the methodology are not static. Rather, they may change, based on heuristic information, as more subjects utilize the training and assessment programs provided by Posit Science Corporation. Therefore, modifications to advancement/progression methodology are anticipated. In addition, one skilled in the art will appreciate that the exercises and stimuli described are merely a subset that can be used within a training or assessment environment.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims. For example, various embodiments of the methods disclosed herein may be implemented by program instructions stored on a memory medium, or a plurality of memory media.

We claim:

1. A method for improving tactile sensitivity and precision and accuracy of motor control of the hand of a subject, utilizing a computing device to present stimuli to the subject, and to record responses from the subject, the method comprising:

providing a joystick, communicatively coupled to the computing device, and configured to provide commands to the computing device, wherein the joystick comprises:
a base;
a shaft movably coupled to the base; and
a textured surface covering at least a portion of the joystick, wherein the textured surface comprises a specified level of bumpiness; and executing a computer-implemented exercise, comprising:
presenting one or more stimuli to the subject via a computer display, including presenting at least one target;
requiring the subject to respond to the stimuli via the joystick, including requiring the subject to use the joystick to move a cursor to the at least one target, and, upon reaching the at least one target, disengage the subject's hand from the joystick, wherein the subject is required to perform said moving and reaching within a specified duration;
recording the subject's response to the stimuli;
determining whether the subject responded correctly to the stimuli;
indicating to the subject whether the subject responded correctly to the stimuli;
modifying the specified duration based on whether the subject responded correctly to the stimuli; and
repeating said presenting, said requiring, said recording, said determining, said indicating, and said modifying a plurality of times in an iterative manner to improve tactile sensitivity, and precision and accuracy of motor control of the hand of the subject, wherein said repeating comprises performing a plurality of trials under each of a plurality of conditions, wherein each condition specifies one or more attributes of the stimuli, their presentation, and/or the textured surface of the joystick, and wherein the conditions become more difficult as the exercise progresses, and wherein said performing a plurality of trials under each of a plurality of conditions comprises progressively modifying one or more of the attributes as the subject progresses through the exercise, and wherein said presenting one or more stimuli comprises presenting a plurality of targets in succession, including presenting a path to each successive target;

wherein said requiring the subject to respond comprises:
for each target, requiring the subject to move the cursor to the target along the path for the target using the joystick, hold the cursor in the target for a specified time interval, and disengage from the joystick; and
wherein each successive target is presented only after the previous target has been responded to.

2. The method of claim 1, wherein the bumpiness comprises a plurality of bumps at a specified density and range of bump sizes.

3. The method of claim 1, wherein said disengaging the subject's hand from the joystick comprises:
the subject letting go of the joystick; and
the subject pressing a key of the computing device or the joystick to indicate that the subject has let go of the joystick.

4. The method of claim 1, wherein the joystick further comprises one or more sensors coupled to the shaft, configured to detect engagement of the subject's hand with the joystick, and wherein said disengaging the subject's hand from the joystick comprises:
the subject letting go of the joystick;
the joystick sensing the disengagement with the one or more sensors; and
the joystick indicating the disengagement.

5. The method of claim 1, wherein the joystick further comprises a rugose surface.

6. The method of claim 1, wherein said modifying the duration comprises:
modifying the duration in accordance with a maximum likelihood procedure.

7. The method of claim 6, wherein the maximum likelihood procedure comprises one or more of:
a QUEST (quick estimation by sequential testing) threshold procedure; or
a ZEST (zippy estimation by sequential testing) threshold procedure.

8. The method of claim 1, wherein said modifying the duration comprises:
modifying the duration in accordance with one or more of:
an N-up/M-down procedure, comprising:
increasing the duration if the subject incorrectly performs N trials consecutively; and
decreasing the duration if the subject correctly performs M trials consecutively; or
receiving user input to the computing device from a clinician or attendant modifying the duration according to a specified scheme.

9. The method of claim 1, wherein said modifying the duration comprises:
increasing the duration if the subject failed to respond correctly to the stimuli; and
decreasing the duration if the subject responded correctly to the stimuli.

10. The method of claim 1, further comprising:
assessing the subject's progress in the exercise two or more times.

11. The method of claim 10, wherein said assessing the subject's progress is performed using a maximum likelihood procedure.

12. The method of claim 11, wherein, maximum likelihood procedure comprises one or more of:
a QUEST (quick estimation by sequential testing) threshold procedure; or
a ZEST (zippy estimation by sequential testing) threshold procedure.

13. The method of claim 1,
wherein said presenting one or more stimuli comprises presenting a plurality of targets in succession;
wherein said requiring the subject to respond comprises:
for each target, requiring the subject to move the cursor to the target using the joystick, hold the cursor in the target for a specified time interval, and disengage from the joystick; and
wherein each successive target is presented only after the previous target has been responded to.

14. The method of claim 13, wherein each of the plurality of conditions specifies one or more attributes, wherein the attributes comprise one or more of:
target size;

number of targets;
distance to next target;
bumpiness of the textured surface of the joystick; or
rugosity of the textured surface of the joystick.

15. The method of claim 1, wherein each of the plurality of conditions specifies one or more attributes, wherein the attributes comprise one or more of:
width of the path;
number of corners in the path;
length of distance to travel; or
number of border hits allowed before a failure.

16. The method of claim 15, wherein the attributes further comprise one or more of:
target size;
number of targets;
distance to next target;
bumpiness of the textured surface of the joystick; or
rugosity of the textured surface of the joystick.

17. The method of claim 1, further comprising:
indicating whether or not the subject responded correctly, wherein said indicating is performed audibly and/or graphically.

18. The method of claim 1, wherein said repeating occurs a specified number of times each day, for a number of days.

19. A computer readable memory medium that stores program instructions for improving tactile sensitivity and precision and accuracy of motor control of the hand of a subject, utilizing a computing device to present stimuli to the subject, and to record responses from the subject, wherein the program instructions are executable to perform:
receiving commands from a joystick coupled to the computing device, wherein the joystick comprises:
a base;
a shaft movably coupled to the base; and
a textured surface covering at least a portion of the joystick, wherein the textured surface comprises a specified level of bumpiness; and
executing a computer-implemented exercise, comprising:
presenting one or more stimuli to the subject via a computer display, including presenting at least one target;
requiring the subject to respond to the stimuli via the joystick, including requiring the subject to use the joystick to move a cursor to the at least one target, and, upon reaching the at least one target, disengage the subject's hand from the joystick, wherein the subject is required to perform said moving and reaching within a specified duration;
recording the subject's response to the stimuli;
determining whether the subject responded correctly to the stimuli;
indicating to the subject whether the subject responded correctly to the stimuli;
modifying the specified duration based on whether the subject responded correctly to the stimuli; and
repeating said presenting, said requiring, said recording, said determining, said indicating, and said modifying a plurality of times in an iterative manner to improve tactile sensitivity and precision and accuracy of motor control of the hand of the subject, wherein said repeating comprises performing a plurality of trials under each of a plurality of conditions, wherein each condition specifies one or more attributes of the stimuli, their presentation, and/or the textured surface of the joystick, and wherein the conditions become more difficult as the exercise progresses, and wherein said performing a plurality of trials under each of a plurality of conditions comprises progressively modifying one or more of the attributes as the subject progresses through the exercise, and wherein said presenting one or more stimuli comprises presenting a plurality of targets in succession, including presenting a path to each successive target;
wherein said requiring the subject to respond comprises:
for each target, requiring the subject to move the cursor to the target along the path for the target using the joystick, hold the cursor in the target for a specified time interval, and disengage from the joystick; and
wherein each successive target is presented only after the previous target has been responded to.

20. A system, comprising:
a computing device, comprising:
a processor; and
a memory, coupled to the processor, wherein the memory stores program instructions for improving tactile sensitivity and precision and accuracy of motor control of the hand of a subject; and
a joystick, communicatively coupled to the computing device, and configured to provide commands to the computing device, wherein the joystick comprises:
a base;
a shaft movably coupled to the base; and
a textured surface covering at least a portion of the joystick, wherein the textured surface comprises a specified level of bumpiness;
wherein the program instructions are executable by the processor to:
execute a computer-implemented exercise, wherein to execute the computer-implemented exercise, the program instructions are executable to:
present one or more stimuli to the subject via a computer display, including presenting at least one target;
require the subject to respond to the stimuli via the joystick, including requiring the subject to use the joystick to move a cursor to the at least one target, and, upon reaching the at least one target, disengage the subject's hand from the joystick, wherein the subject is required to perform said moving and reaching within a specified duration;
record the subject's response to the stimuli;
determine whether the subject responded correctly to the stimuli;
indicate to the subject whether the subject responded correctly to the stimuli;
modify the specified duration based on whether the subject responded correctly to the stimuli; and
repeat said presenting, said requiring, said recording, said determining, said indicating, and said modifying a plurality of times in an iterative manner to improve tactile sensitivity and precision and accuracy of motor control of the hand of the subject, wherein said repeating comprises performing a plurality of trials under each of a plurality of conditions, wherein each condition specifies one or more attributes of the stimuli, their presentation, and/or the textured surface of the joystick, and wherein the conditions become more difficult as the exercise progresses, and wherein said performing a plurality of trials under each of a plurality of conditions comprises progressively modifying one or more of the attributes as the subject progresses through the exercise, and wherein said presenting one or more stimuli comprises presenting a plurality of targets in succession, including presenting a path to each successive target;

wherein said requiring the subject to respond comprises:

for each target, requiring the subject to move the cursor to the target along the path for the target using the joystick, hold the cursor in the target for a specified time interval, and disengage from the joystick; and wherein each successive target is presented only after the previous target has been responded to.

* * * * *